Feb. 8, 1966 M. BAERMANN 3,233,950
PERMANENT MAGNETIC BEARING
Filed May 28, 1962

INVENTOR.
MAX BAERMANN
BY
ATTORNEY

United States Patent Office 3,233,950
Patented Feb. 8, 1966

3,233,950
PERMANENT MAGNETIC BEARING
Max Baermann, Bensberg Wulfshof Bezirk,
Cologne, Rhine, Germany
Filed May 28, 1962, Ser. No. 197,942
Claims priority, application Germany, May 30, 1961,
B 62,702
7 Claims. (Cl. 308—10)

The present invention pertains to the art of bearings, and more particularly to an improved permanent magnetic bearing.

The present invention is particularly applicable for use in an electric meter and it will be discussed with particular reference thereto; however, it is to be appreciated that the invention has much broader applications and may be used as a bearing for a variety of precision devices.

Magnetic bearings are common in electrical measuring devices wherein use is made of the attracting forces between opposite magnetic poles or the repelling forces between similar magnetic poles for the purpose of reducing frictional forces. The latter type of magnetic bearings is the most commonly used. Such prior permanent magnetic bearings often incorporated a ring-shaped magnet on the rotating shaft and a similar magnet on a support member. These ring-shaped permanent magnets were coaxially mounted and axially spaced so that they could be radially magnetized, i.e. magnetized to have one magnetic pole adjacent the internal cylindrical surface of the ring and an opposite magnetic pole adjacent the external cylindrical surface. By arranging like poles in corresponding positions on the axially spaced rings, the repelling forces between the like poles were used as the bearing force.

In another known permanent magnetic bearing arrangement, two axially magnetized cylindrical permanent magnets were positioned coaxially with like poles facing each other. These prior permanent magnetic bearings did not provide an accurate bearing support and often they caused radial forces which tended to increase the frictional drag between magnets and their mounting supports.

In addition, all the known permanent magnetic bearings were characterized by having a poor displacement stability. The term "displacement stability" refers to the inherent characteristic of the magnetic bearing to oppose any force tending to change the spacing between the permanent magnets. A permanent magnetic bearing having a low displacement stability is susceptible to considerable displacement of the magnets from their equilibrium position which displacement often causes extreme frictional forces between the magnets or their support structures.

The present invention is directed toward a permanent magnetic bearing which overcomes these disadvantages and, most importantly, exhibits a high displacement stability.

In accordance with the present invention there is provided an improvement in a permanent magnet bearing having a pair of spaced bearing members with closely spaced facing surfaces defining an air gap, and with one of the members being rotatable with respect to the other member on an axis generally perpendicular to the surfaces. The improvement comprises providing each of the members with substantially identical pairs of opposite polarity, circular magnetic poles on the facing surfaces and coaxial with the axis of rotation. The poles of one member face like poles on the other member and the axis of magnetization of each of the poles is substantially normal to the facing surfaces and extends through the air gap whereby the lines of force of the poles are concentrated within the air gap.

The primary object of the present invention is the provision of a permanent magnetic bearing which is stable in operation, inexpensive to construct and has a high ratio between the magnetic bearing forces and the magnetic bearing area.

Another object of the present invention is the provision of a permanent magnetic bearing of the type having spaced permanent magnetic members which bearing has a high displacement stability, i.e. as the spacing between the members changes slightly in response to an external force, the inherent corrective force increases rapidly.

Still another object of the present invention is the provision of a permanent magnetic bearing of the type having spaced permanent magnetic members, which bearing has a minimum amount of magnetic lines of force outside the space between the members.

Another object of the present invention is the provision of a permanent magnetic bearing of the type having spaced permanent magnetic members, which bearing has a pair of concentric circular poles of opposite polarity in each member with the poles of one member facing like poles of the other member and each pair of poles having a magnetic circuit confined within the respective members.

Still another object of the present invention is the provision of a permanent magnetic bearing of the type having spaced permanent magnetic members, which bearing members have concentric circular poles of opposite polarity with the poles being spaced from each other a distance less than five millimeters.

Yet another object of the present invention is the provision of a permanent magnetic bearing of the type having spaced permanent magnet members, which bearing members are spaced from each other a distance of one millimeter or less.

Still another object of the present invention is the provision of a permanent magnetic bearing of the type having spaced permanent magnetic members, which bearing members are formed from a low permeability permanent magnetic material. Preferably, the permeability of the members is close to the permeability of air, i.e., one.

Another object of the present invention is the provision of a permanent magnetic bearing of the type having spaced permanent magnetic members, which bearing members are formed from a permanent magnetic material having a coercive force greater than 1,000 Oersteds.

Another object of the present invention is the provision of a permanent magnetic bearing of the type having spaced permanent magnetic members, which bearing members are formed from anisotropic permanent magnetic material.

Still another object of the present invention is the provision of a bearing member as described above wherein the bearing members are formed from a mixture of isotropic or anisotropic permanent magnetic material with a binder.

Another object of the present invention is the provision of a permanent magnetic bearing of the type described above wherein the permanent magnetic members are formed from barium ferrite or a mixture of barium ferrite and a binder.

These and other objects and advantages will become apparent from the following description used to illustrate preferred embodiments of the invention as read in connection with the accompanying drawings in which.

Figure 1:
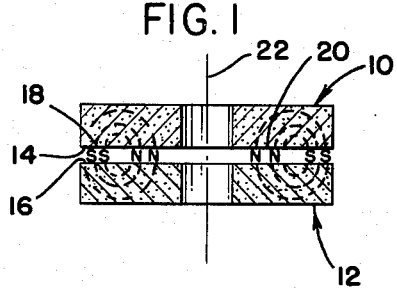
FIGURE 1 is a somewhat schematic cross sectional view illustrating the preferred embodiment of the present invention.

Referring now to the drawings wherein the showings are for the purpose of illustrating the preferred embodiments of the invention only and not for the purpose of limiting same, FIGURE 1 shows a pair of axially spaced permanent magnetic members 10, 12 generally in the shape of a ring or washer which are axially aligned and vertically spaced from each other. In practice, the member 10 may be secured onto a rotatable member while the member 12 is non-rotatably supported. In this manner, the member 10 floats above the member 12 to provide a support bearing. In accordance with the present invention, the permanent magnetic material used in construction of the members 10, 12 is of a type having a high coercive force preferably more than 1,000 Oersteds. Barium ferrite is a material exhibiting a high coercive force and is the preferred material for use in the construction of the members 10, 12, although it is appreciated that certain other permanent magnetic materials may be used in these members without departing from the intended scope of the present invention.

In a permanent magnetic bearing especially of the type used in an electric meter, it is especially important that the magnetic forces, viewed in its circumferential direction, be completely equal and uniform so that no resistance torque is developed as the magnetic members rotate with respect to each other. It has been found that a constant magnetic force distribution is readily obtained by producing the magnetic members 10, 12 from a mixture of isotropic or anisotropic permanent magnetic powder held together by a binder, such as a plastic material. In such a plastic bonded permanent magnet, a perfectly uniformed distribution of the permanent magnetic powder can be achieved so that the magnetic forces between the permanent magnetic members are uniform in a circumferential direction and no resistance torque is created as the members rotate with respect to each other. The permanent magnetic material used in the construction of the permanent magnetic members 10, 12 should also have a low permeability so that closely spaced north and south magnetic poles may be positioned on one surface of the permanent magnetic members without appreciable leakage through the material from one pole to the other. This allows the lines of force from the north pole to the south pole to form an arc extending outwardly from the surface on which the poles are located. This feature will be discussed hereinafter in more detail.

The permanent magnetic members 10, 12 are characterized by having substantially flat surfaces 14, 16 which are spaced vertically from each other. On each of the facing surfaces there are provided generally circular south poles 18 and north poles 20 which are coaxial with respect to the axis 22 of the members. Accordingly, the north and south poles are concentric with respect to each other and like poles of the members 10, 12 are positioned opposite each other so that the members are repelled by the magnetic field between the members. In accordance with the invention, the north and south concentric poles 18, 20 are positioned on the facing surfaces of the magnetic members 10, 12. In this manner, magnetic lines of force between the north and south poles are concentrated in the space between the members and a very few, if any, magnetic lines of force pass outside of this space. This high concentration of magnetic lines of force between the members imparts a high displacement stability to the permanent magnetic bearing which feature will be discussed in detail later. The spacing between the members and the radial spacing between the concentric north and south poles must be so dimensioned that the proper concentration of magnetic lines of force is obtained. The opposite poles of the members can be closely spaced with respect to each other and can be on one surface of the permanent magnetic members because the material used in the members is of low permeability which prevents leakage of the lines of force through the material from one pole to the other and, thus, causes the lines of force to pass outwardly from the surfaces 14 and 16. Without the tendency of the lines of force to extend outwardly from the facing surfaces, the beneficial characteristics of the present invention would not be completely realized. If barium ferrite is used in the construction of the members, a permeability of approximately one can be obtained.

Figure 2:
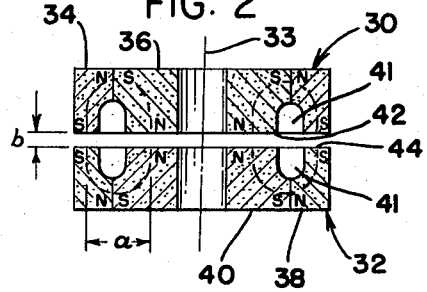
FIGURE 2 is a somewhat schematic cross sectional view illustrating a modification of the preferred embodiment disclosed in FIGURE 1.

Referring now to FIGURE 2, there is illustrated a modification of the preferred embodiment shown in FIGURE 1. Permanent magnetic members, 30, 32 are rotatably mounted with respect to each other on an axis 33 and comprise separate ring-shaped permanent magnets 34, 36, 38 and 40. These ring-shaped magnets are magnetized as indicated so that opposite polarity magnetic poles are positioned on opposite sides of the toroidal shaped recess 41 between the magnets forming the members 30, 32. These magnetic poles are similar to poles 18, 20 of FIGURE 1 and are positioned on facing surfaces 42, 44 so that the magnetic lines of force passing between the north and south magnetic poles are concentrated in the space between the surfaces 42, 44. An important aspect of the present invention is the spacing between the north and south magnetic poles which spacing is indicated as "$a$" and must be less than five millimeters. The surfaces 42 and 44 are spaced from each other a distance "$b$" which distance should not be greater than one millimeter. By providing this proper spacing between the magnetic poles and the magnetic members, it is assured that the lines of force between the poles are concentrated in spacing between the members and are not dispersed outside the periphery of the members. Accordingly, by using low permeability, anisotropic permanent magnetic material there is a high concentration of lines of force between the members 30, 32. This high concentration provides a high displacement stability, the importance of which has been described. The radial thickness of magnets 34, 38 is substantially smaller than the radial thickness of magnets 36, 40 and is so proportioned that the area of the magnetic poles on these magnets will be substantially equal.

Figure 3:
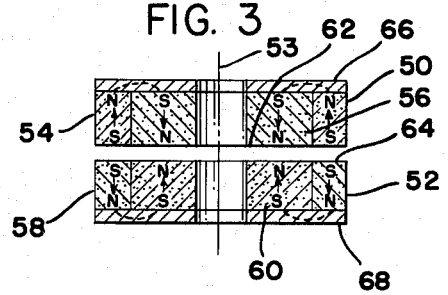
FIGURE 3 is a somewhat schematic cross sectional view illustrating a further modification of the preferred embodiment disclosed in FIGURE 1.

Referring now to FIGURE 3, a further modification of the preferred embodiment disclosed in FIGURE 1 is illustrated wherein permanent magnetic members 50, 52 are coaxially mounted about axis 53 and comprise ring-shaped permanent magnets 54, 56, 58 and 60 similar to the ring-shaped magnets of FIGURE 2. The permanent magnets are axially magnetized so that spaced opposite polarity poles are exhibited on surfaces 62, 64. To complete the magnetic circuit between the separate permanent magnets, there are provided plates 66, 68 formed from a high permeability ferro-magnetic material, such as soft iron. The spacing between separate poles on the facing surfaces 62, 64, may be reduced to substantially zero if the material used for the ring-shaped permanent magnets has a low permeability such as found in barium ferrite magnets. If the permeability does not approach unity, it may be advisable to provide a recess 41 as shown in FIGURE 2 between the adjacent poles. This recess decreases the flux concentration within the spacing and should be kept to a minimum thickness.

Figure 4:
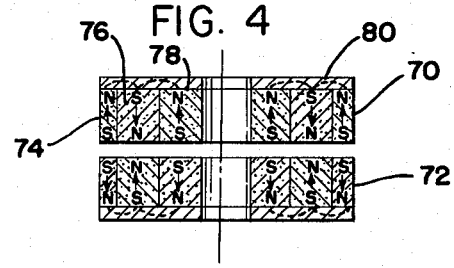
FIGURE 4 is a somewhat schematic cross sectional view illustrating still a further modification of the preferred embodiment disclosed in FIGURE 1.

FIGURE 4 shows a further modification of the preferred embodiment illustrated in FIGURE 1 and is quite similar to the modification shown in FIGURE 3 with exception that the members 70, 72 are formed from three ring-shaped permanent magnets 74, 76 and 78. These magnets are radially magnetized and the magnetic circuit is completed through the high permeability plate 80. The relative dimension of the permanent magnetic magnets 74, 76 and 78 is such that the area of the north and south poles facing toward the adjacent members is substantially equal.

Figure 5:
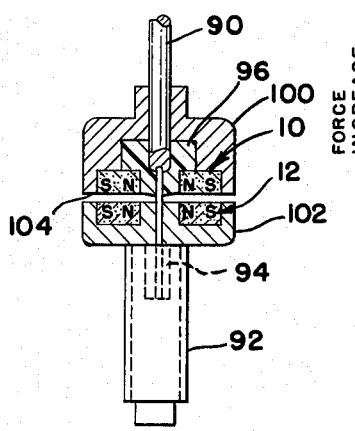
FIGURE 5 is a partial cross sectional view illustrating one use of the preferred embodiment disclosed in FIGURE 1.

Referring now to FIGURE 5, the preferred embodiment of the invention as shown in FIGURE 1 is illustrated in connection with a bearing structure wherein the rotor shaft 90 is vertically spaced from the bearing support 92. To prevent radial displacement between the shaft and the support there is provided a needle bearing 94 which allows vertical displacement but prevents radial shifting. The lower portion of the needle bearing is secured to the bearing support 92 and the upper portion is journaled within the bearing 96 which may be formed of a self lubricating plastic material. The permanent magnet members 10, 12 are supported within the magnet housings 100, 102 to present an active air gap 104. The repelling forces between the members 10, 12 rotatably support the shaft 90 with respect to the bearing support 92.

A permanent magnetic bearing constructed in accordance with the present invention exhibits a greatly improved displacement stability which indicates that the floating permanent magnetic bearing member is not easily displaced from its original equilibrium position. The displacement stability feature of permanent magnetic bearings is illustrated in the graph shown in FIGURE 6 wherein the abscissa indicates the spacing between the permanent magnets of the bearing and the ordinate indicates the repulsion force between the magnets. The units on the ordinate and abscissa are representative and should not be taken as real values. The horizontal line $m$ indicates the gravitational force between the vertically arranged permanent magnets and the line $n$ illustrates the repulsion force between the permanent magnets as the space between the magnets changes. It is noted that $n$ has a negative slope and the repulsion force decreases as the space in between the poles increases. The intersection $o$ between the lines $m$ and $n$ indicates the spacing between the magnets at which the gravitational force represented by line $m$ equalizes the repulsion force in the opposite direction represented by the line $n$. Accordingly, the floating permanent magnet tends to remain at the point $o$. As the floating magnet receives external forces, it is displaced from the point $o$ along the line $n$ which forms an angle $c$ with the line $m$. For instance, during vibration of the floating magnet, it may move to the position $t$ on line $n$. At this position, the force tending to return the magnet to the point $o$ is represented by vector F the magnitude of which is determined by the angle $c$. The vector F represents the difference between the gravitational force and the increased repulsion force which tends to lift the magnet upward from its downwardly displaced position. The permanent magnet illustrated by the operating line $n$ has a low displacement stability because the angle $c$ is small which indicates that the floating permanent magnet may be moved a substantial distance along line $n$ without receiving a substantial correcting force.

The line $p$ illustrates the operating line of a permanent magnetic bearing having a high displacement stability, such as a permanent magnetic bearing constructed in accordance with the present invention. The angle $c'$ between the operating line $p$ and the gravitational line $m$ is substantially larger than the angle $c$ of the permanent magnetic bearing having low displacement stability. The force F which was the correcting force in the first example and equals the force that caused the displacement of the floating magnet along line $m$, can cause only a slight deviation of a magnet from the operating point $o$ along the line $p$. In order to displace the floating magnet having an operating line $p$ the same distance as a floating magnet having operating line $n$ a substantially larger force F' must be exerted on the floating magnet.

Figure 6:
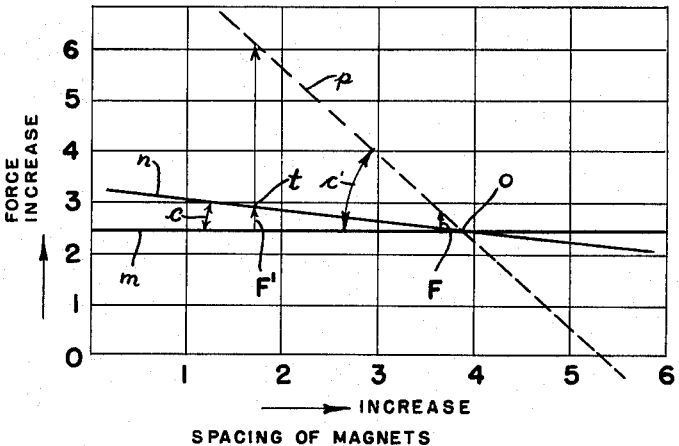
FIGURE 6 is a graph illustrating the displacement stability of a permanent magnet bearing constructed in accordance with the present invention.

In order to obtain a high displacement stability as indicated by operating line $p$ of FIGURE 6, the repulsion force between the permanent magnets must drop rapidly as the distance increases. This high displacement stability is especially important for axial bearing in electric meters as shown in FIGURE 5. In such devices, the air gap between the permanent magnets is very small. During operation of the meter external forces may act in an axial direction on the floating magnet which forces may be caused by vibration or other disturbances. If the displacement stability of the bearing is not substantially high, these vibrations or other external forces may cause the floating permanent magnet to drag on the support structure or on the other permanent magnet. This decreases the accuracy of the electric meter and is considered highly undesirable.

In order to achieve the sharply inclined operating line $p$, the lines of force between the permanent magnets must be concentrated in the immediate vicinity of the space between the magnets and cannot be distributed outwardly from the periphery of the magnets. For this reason, the spacing between the magnets must not be greater than one millimeter. To provide a high repulsion force in the space between the two magnets, in accordance with the present invention, the north and south magnetic poles of the permanent magnet are positioned only on the facing surfaces of the magnets. Thus, a U-shaped path for the lines of force is presented within the magnet body itself. In order that lines of force issuing from the magnetic poles on the surfaces may be highly concentrated in the space between the surfaces, the average pole distance of a pair of poles is less than five millimeters. In order to obtain the proper repulsion force, the dimensions of the magnets may be changed to vary the volume of the magnets. With the small diameter on the magnets, the magnets must be magnetized to have only one pair of circular poles; however, a larger diameter magnet may have a plurality of pairs of circular poles without departing from the intended scope of the present invention.

In accordance with the present invention, the magnetic lines of force are always circulating in a closed circle so that all lines of force issuing from a north pole flow again to the south pole and the concentric north and south pole surfaces are substantially equal in area to provide uniform distribution of the magnetic lines of force passing outwardly from the facing surfaces of the magnets.

Having thus described my invention I claim:

1. In a permanent magnet bearing having a pair of spaced bearing members with closely spaced facing surfaces defining a separating air gap, one of said members being rotatable with respect to the other of said members on an axis generally perpendicular to said surfaces, the improvement comprising; each of said members having substantially identical pairs of opposite polarity, circular magnetic poles on said facing surfaces and coaxial with said axis with the poles of one member facing like poles on the other member and the axes of magnetization of each of said poles being substantially normal to said facing surfaces and extending through said air gap whereby the lines of force of said poles are concentrated within said air gap.

2. The improvement as defined in claim 1 wherein said members comprise a permanent magnetic material having a coercive force of at least 1,000 Oersteds.

3. The improvement as defined in claim 2 wherein said material has a substantially unity permeability.

4. The improvement as defined in claim 1 wherein said members comprise a mixture of finely divided anisotropic permanent magnet material embedded within and dispersed throughout a binder.

5. The improvement as defined in claim 1 wherein said opposite polarity concentric poles on each of said surfaces have substantially equal pole areas.

6. In a permanent magnet bearing having a pair of spaced bearing members with closely spaced facing surfaces defining a separating air gap, one of said members being rotatable with respect to the other of said members on an axis generally perpendicular to said surfaces, the improvement comprising: each of said members comprising a first and second ring-shaped magnet, said magnets being axially magnetized to have a first and second magnetic pole and mounted concentrically to exhibit said first magnetic poles as concentric, opposite polarity magnetic poles on said facing surfaces with said first poles on said facing surfaces being coaxial with said axis and the axes of magnetization of each of said first poles on said facing surfaces being substantially normal to said facing surfaces and extending through said air gap whereby the lines of force of said poles are concentrated within said air gap and means for magnetically connecting said second magnetic poles of said first and second magnets of each member.

7. The improvement as defined in claim 6 wherein said magnetic connecting means is a high permeability means mounted adjacent the axial end of said ring-shaped magnets opposite from said facing surfaces.

References Cited by the Examiner

UNITED STATES PATENTS

| | | | |
|---|---|---|---|
| 2,315,408 | 3/1943 | Faus | 308—10 |
| 2,658,805 | 11/1953 | Mendelsohn | 308—1 |
| 2,747,944 | 5/1956 | Baermann | 308—10 |
| 2,803,765 | 8/1957 | Timmerman | 310—156 |
| 3,059,131 | 10/1962 | Everard et al. | 310—164 |

FOREIGN PATENTS 815,311  6/1959  Great Britain.

OTHER REFERENCES

IBM Technical Disclosure Bulletin: vol. 3, number 1, June 1, 1960.

ORIS L. RADER, *Primary Examiner.*

MILTON O. HIRSHFIELD, *Examiner.*

Notice of Adverse Decision In Interference

In Interference No. 96,739 involving Patent No. 3,233,950, M. Baermann, PERMANENT MAGNETIC BEARING, final judgment adverse to the patentee was rendered Mar. 15, 1972, as to claims 1, 2 and 5.

[*Official Gazette November 21, 1972.*]